(12) United States Patent
Toubiana et al.

(10) Patent No.: US 10,785,132 B2
(45) Date of Patent: Sep. 22, 2020

(54) METHOD AND SERVER FOR MONITORING USERS DURING THEIR BROWSING WITHIN A COMMUNICATIONS NETWORK

(75) Inventors: Vincent Toubiana, Paris (FR); Gérard Burnside, Nozay (FR); Olivier Le Berre, Nozay (FR)

(73) Assignee: Provenance Asset Group LLC, Pittsford, NY (US)

(*) Notice: Subject to any disclaimer, the term of this patent is extended or adjusted under 35 U.S.C. 154(b) by 556 days.

(21) Appl. No.: 14/237,092

(22) PCT Filed: Aug. 24, 2012

(86) PCT No.: PCT/EP2012/066498
§ 371 (c)(1),
(2), (4) Date: Aug. 5, 2014

(87) PCT Pub. No.: WO2013/030107
PCT Pub. Date: Mar. 7, 2013

(65) Prior Publication Data
US 2014/0351418 A1 Nov. 27, 2014

(30) Foreign Application Priority Data
Aug. 29, 2011 (FR) .................................... 11 57582

(51) Int. Cl.
*H04L 12/26* (2006.01)
*H04L 29/08* (2006.01)
*G06Q 30/02* (2012.01)

(52) U.S. Cl.
CPC ............. *H04L 43/08* (2013.01); *G06Q 30/02* (2013.01); *H04L 67/02* (2013.01); *H04L 67/146* (2013.01);
(Continued)

(58) Field of Classification Search
CPC ......... G06Q 30/02; H04L 67/22; H04L 67/02; H04L 67/146; H04L 67/2852;
(Continued)

(56) References Cited

U.S. PATENT DOCUMENTS

| 5,774,670 A | * | 6/1998 | Montulli | G06F 17/30899 |
| | | | | 707/E17.119 |
| 5,796,952 A | * | 8/1998 | Davis | G06F 11/3438 |
| | | | | 707/E17.12 |

(Continued)

FOREIGN PATENT DOCUMENTS

| CN | 1819518 A | 8/2006 |
| EP | 1 244 016 A1 | 9/2002 |

(Continued)

OTHER PUBLICATIONS

Zahlpixel, Wikipedia, 3 pages, XP055022984, Mar. 21, 2011 (retrieved Mar. 236, 2012).

(Continued)

*Primary Examiner* — Abdullahi E Salad
(74) *Attorney, Agent, or Firm* — Dinsmore & Shohl LLP

(57) ABSTRACT

A method for monitoring browsers (B) for a communications network (N), wherein a monitoring server contains a set of monitoring elements, and implements:—a step (E1) of receiving a monitoring element request from a browser (B),—a step (E2) of determining whether the request is a first request from the browser,—if so, a step (E3) of calculating an identifier for the browser, then a step (E4) of determining a cache duration value associated with each monitoring element of the set, and a step (E5) of transmitting the set of monitoring elements and associated values to the browser;—if not, a step (E6) of determining the browser's identifier based on the monitoring elements requested in the request.

11 Claims, 3 Drawing Sheets

(52) U.S. Cl.
CPC ............ H04L 67/22 (2013.01); H04L 67/289 (2013.01); H04L 67/2852 (2013.01); *H04L 67/20* (2013.01); *H04L 67/2814* (2013.01)

(58) Field of Classification Search
CPC ....... H04L 67/289; H04L 43/08; H04L 67/20; H04L 67/2814
See application file for complete search history.

(56) References Cited

U.S. PATENT DOCUMENTS

| | | | | |
|---|---|---|---|---|
| 6,018,619 | A * | 1/2000 | Allard | H04L 12/24 709/211 |
| 6,021,426 | A * | 2/2000 | Douglis | G06F 17/3089 705/26.4 |
| 6,112,240 | A * | 8/2000 | Pogue | G06F 11/3466 709/202 |
| 6,275,854 | B1 * | 8/2001 | Himmel | G06F 11/3419 705/14.68 |
| 7,634,570 | B2 | 12/2009 | Paya et al. | |
| 7,752,261 | B1 * | 7/2010 | Nalam | G06F 15/16 709/203 |
| 8,316,124 | B1 * | 11/2012 | Baumback | H04L 67/22 709/224 |
| 8,504,775 | B2 * | 8/2013 | Plamondon | G06F 17/30902 711/133 |
| 8,533,350 | B2 * | 9/2013 | Jakobsson | H04L 63/0807 709/229 |
| 8,954,566 | B1 * | 2/2015 | Nygaard | G06F 9/50 709/224 |
| 9,043,385 | B1 * | 5/2015 | Lepeska | G06F 17/30902 709/203 |
| 9,106,607 | B1 * | 8/2015 | Lepeska | G06F 16/9574 |
| 9,112,850 | B1 * | 8/2015 | Eisen | H04L 63/10 |
| 9,307,003 | B1 * | 4/2016 | Sebastian | H04L 67/2847 |
| 2002/0099807 | A1 * | 7/2002 | Doyle | G06F 17/30902 709/223 |
| 2002/0147772 | A1 * | 10/2002 | Glommen | G06F 11/3495 709/203 |
| 2002/0184364 | A1 * | 12/2002 | Brebner | G06F 11/3438 709/224 |
| 2003/0233329 | A1 * | 12/2003 | Laraki | G06Q 20/123 705/52 |
| 2004/0098229 | A1 * | 5/2004 | Error | G06F 17/3089 702/186 |
| 2004/0122943 | A1 * | 6/2004 | Error | H04L 29/06 709/224 |
| 2004/0167943 | A1 * | 8/2004 | Margolus | G06F 17/30368 |
| 2004/0181598 | A1 * | 9/2004 | Paya | G06F 17/30902 709/227 |
| 2004/0243704 | A1 * | 12/2004 | Botelho | G06F 17/3089 709/224 |
| 2004/0254942 | A1 * | 12/2004 | Error | G06F 17/3089 |
| 2005/0268225 | A1 * | 12/2005 | Pelegri-Llopart | G06F 8/31 715/255 |
| 2007/0106748 | A1 * | 5/2007 | Jakobsson | H04L 63/0807 709/217 |
| 2007/0124480 | A1 * | 5/2007 | Heled | G06F 17/30867 709/227 |
| 2008/0004958 | A1 * | 1/2008 | Ralph | G06Q 30/02 705/14.45 |
| 2008/0005273 | A1 * | 1/2008 | Agarwalla | G06F 17/30902 709/217 |
| 2008/0196107 | A1 * | 8/2008 | Yip | H04L 41/0813 726/27 |
| 2008/0228772 | A1 * | 9/2008 | Plamondon | G06F 17/30902 |
| 2008/0250136 | A1 * | 10/2008 | Izrailevsky | H04L 67/22 709/224 |
| 2008/0256234 | A1 * | 10/2008 | Sispoidis | G06Q 30/02 709/224 |
| 2008/0270412 | A1 * | 10/2008 | Udayasankar | G06F 11/3438 |
| 2009/0017805 | A1 * | 1/2009 | Sarukkai | H04W 28/06 455/414.3 |
| 2009/0019148 | A1 * | 1/2009 | Britton | G06Q 30/02 709/224 |
| 2009/0216882 | A1 * | 8/2009 | Britton | H04L 12/2602 709/224 |
| 2009/0248787 | A1 * | 10/2009 | Sivasubramanian | H04L 29/08729 709/201 |
| 2010/0042837 | A1 * | 2/2010 | Ma | H04L 41/5009 713/168 |
| 2010/0057843 | A1 * | 3/2010 | Landsman | H04L 63/0407 709/203 |
| 2010/0153544 | A1 * | 6/2010 | Krassner | G06F 17/2247 709/224 |
| 2010/0281112 | A1 * | 11/2010 | Plamondon | H04L 67/2847 709/203 |
| 2011/0173071 | A1 * | 7/2011 | Meyer | G06Q 30/02 705/14.54 |
| 2011/0185051 | A1 * | 7/2011 | Reno | G06F 17/30876 709/223 |
| 2011/0213822 | A1 * | 9/2011 | Yavilevich | G06Q 30/02 709/202 |
| 2012/0023156 | A1 * | 1/2012 | Ueda | H04L 67/02 709/203 |
| 2012/0042005 | A1 * | 2/2012 | Papakostas | H04L 29/12018 709/203 |
| 2012/0054440 | A1 * | 3/2012 | Doig | G06F 17/30902 711/122 |
| 2012/0209987 | A1 * | 8/2012 | Rhinelander | G06Q 30/02 709/224 |
| 2017/0116642 | A1 * | 4/2017 | Meyer | G06Q 30/02 |

FOREIGN PATENT DOCUMENTS

JP        2004/280828        10/2004
WO    WO 2011/094272 A1    8/2011

OTHER PUBLICATIONS

International Search Report for PCT/EP2012/066498 dated Oct. 17, 2012.

* cited by examiner

METHOD AND SERVER FOR MONITORING USERS DURING THEIR BROWSING WITHIN A COMMUNICATIONS NETWORK

The present invention relates to monitoring users during their browsing within a communications network.

On the Internet, and more specifically on the network of content known as the Web, attempts are made to monitor users during their browsing in order to provide them with custom services.

For example, on an e-commerce site, the user may select multiple products at separate times while browsing, and place them in a virtual "shopping cart." He or she may pay for them later. The site must therefore be capable of identifying the user in order to assign him or her a personal shopping cart.

Another conventional application is presenting messages (particularly advertisements) adapted to the user's profile. To do so, it is therefore important to monitor the user's browsing and therefore to have means of monitoring the browser that he or she is using.

A first solution to this problem was provided through the use of identification data known as "cookies." This data is transmitted by the server to the browser, which stores them in the form of a file in the memory of the communication terminal on which it is deployed. In each new request to the server, the application attaches this data and is therefore easily and uniquely identified by the server.

FIG. 1 illustrates this mechanism for monitoring by a third-party server. This third-party "monitoring" server ST is functionally different from the content server SC. It may, for example, be an advertising server.

The browser B transmits a content request M1 to a content server SC using the HTTP (HyperText Transfer Protocol) protocol as defined by the IETF (Internet Engineering Task Force). This request M1 identifies a particular resource (generally a Web page or multimedia file) via its URL (Unified Resource Locator).

Upon being received, the content server SC transmits a response M2 containing the requested Web page. This Web page contains a link to the monitoring server ST. This link may be in the form of an inset (e.g., a banner) whose content is provided by that monitoring server.

In order to retrieve this additional content, the browser B transmits a new request M3, this time intended for the monitoring server ST. This request contains not only the resource identifier that was contained within the response M2, but also identification data (a "cookie") for that monitoring server and an identifier of the previously visited content server SC.

Upon receipt, the monitoring server ST may use the identification data in order not only to provide additional content adapted to the user (an advertising element, for example) in a message M4, but also to save the received information so as to build a profile of the user. This profile may particularly keep track of the visited content servers SC in order to determine the user's areas of interest.

However, this mechanism is problematic.

The use of cookies has been heavily criticized with respect to privacy. This mechanism might be dropped due to pressure, but, most importantly, browsers can be configured to not transmit this identification data.

Some applications, such as Safari, are even configured by default to not send identification data to third parties (for example, sites that were not directly visited but which had provided advertising).

Furthermore, users themselves can delete cookies stored on their hard drive to protect their privacy by limiting the transmission of personal data, by mistake, to free up space on the hard drive, or for another reason.

Alternatives are therefore beginning to appear in order to address the shortcomings of the cookie mechanism.

The main alternative is based on the fingerprint of the browser type and on the IP address of the communication terminal on which it is deployed. This fingerprint is made up of information elements transmitted in an HTTP request. They particularly include an identifier of the browser type (Safari, Internet Explorer, Firefox, Mozilla, Chrome, etc.), a version number, and the communication terminal's platform or operating system (Windows, Linux, iOS, Android, etc.).

This solution is not satisfactory either.

There are situations in which the IP address/fingerprint combination is the same for two different browser instances.

This happens when the user opens two sessions on the same machine.

It also happens when a company defines a policy for the software installed on its communications network in such a way that all communication terminals use the same version of the same browser type. The fingerprint will therefore be the same for all of the company's equipment. Furthermore, a conventional network infrastructure choice is to have the company's communications network be linked to the public network via a NAT (Network Address Translator), in such a way that multiple pieces of the company's equipment may be seen by an outside server as having the same IP address.

The same sort of situation occurs within a private home where more than one of the communication terminals (computers) in the house is configured in the same way. The outside server will not be able to distinguish between the different family members.

The result is a large number of cases in which the IP address/fingerprint combination does not form a unique identifier for one browser instance.

The purpose of the present invention is to improve the situation by proposing a new mechanism.

A first object of the present invention is a method for monitoring browsers for a communications network, wherein a monitoring server contains a set of monitoring elements, and implements a step of receiving a monitoring element request from a browser a step of determining whether the request is a first request from the browser, if so, a step of calculating an identifier for the browser, then a step of determining a cache duration value associated with each monitoring element of the set, and a step of transmitting the set of monitoring elements and associated values to the browser;

if not, a step of determining the browser's identifier based on the monitoring elements requested in the request, In different embodiments of the invention, whether a request is a first request may be determined based on the number of monitoring elements requested in said request.

The method may also comprise a prior first step of the browser transmitting a content request to a content server, and of that content server transmitting both the requested content and an inset containing links leading to the monitoring elements.

The identifier may be made up of a first part containing identification information transmitted within said request, and a second part made up of a counter.

The number of monitoring elements in the set of monitoring elements may be equal to the length of that counter, expressed in bits.

The value of a bit b(i) with significance i and the cache duration value associated with the monitoring element at position i may follow the following relationship:

if $b(i)=1$, $v(i)=\max$ if $b(i)=0$, $v(i)=0$ wherein 'max' is the maximum possible value for a given cache duration.

The identifier may also be preceded by a first part indicating chained redirects.

These chained redirects may be indicated by the bit with matching significance in that first part.

Each redirect among those chained redirects may be associated with a cache value of zero or a maximum possible value for a cache value.

Alternatively, each redirect among those chained redirects may be associated with a 301 or 302 redirect code.

A second object of the present invention is a monitoring server containing a set of monitoring elements and means for implementing the previously defined method as well as the indicated embodiments.

A third object of the present invention is a server comprising a monitoring server as defined above and a content server.

Thus, thanks to the invention, it becomes possible to identify the user without using cookies, or more broadly, without it being necessary to install files or information on the user's terminal.

It is also possible to tell the difference between browsers deployed on a single machine or on the same network, and thereby to identify each one of them.

The browser's identifier does not explicitly travel on the communications network, including on the link between the communication terminal and the monitoring server. As a result, the invention is robust with respect to identity theft attempts and other malicious attacks.

The invention, its characteristics and its advantages will appear more clearly in the description of embodiments which follows, together with the attached figures.

FIG. 1, described above, depicts a mechanism of the state of the art.

FIGS. 2 and 3 diagram two architectural embodiments of the invention.

Multiple embodiments of the inventive monitoring server are possible.

It should be noted that the monitoring server ST may be a software application that may be deployed on a dedicated physical server or shared with other applications. It may also be deployed on a set of physical machines (a "cluster") based on a distributed or peer-to-peer operating mode.

Figure 2:
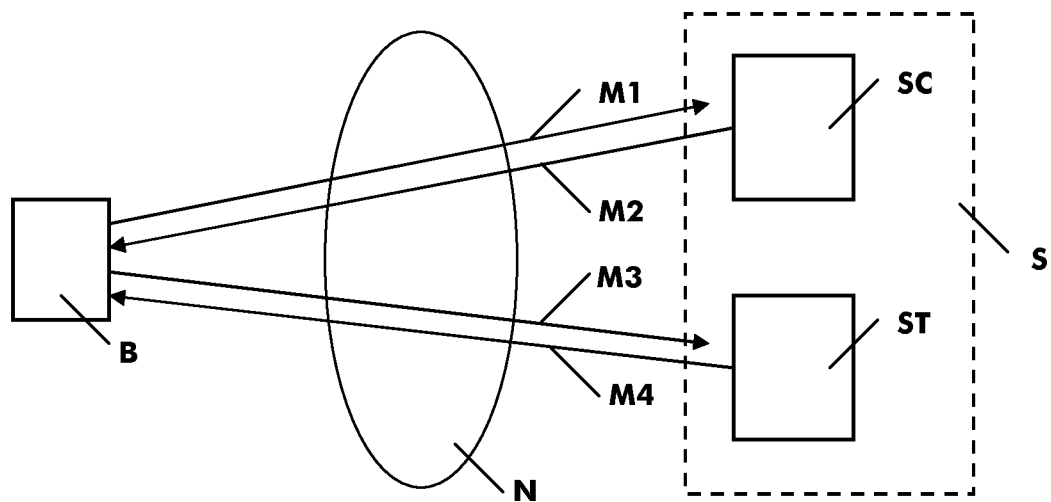

Furthermore, this monitoring server ST may be located with the content server SC on the same physical machine, or in the same "cluster" of physical machines, as depicted by FIG. 2.

Figure 3:
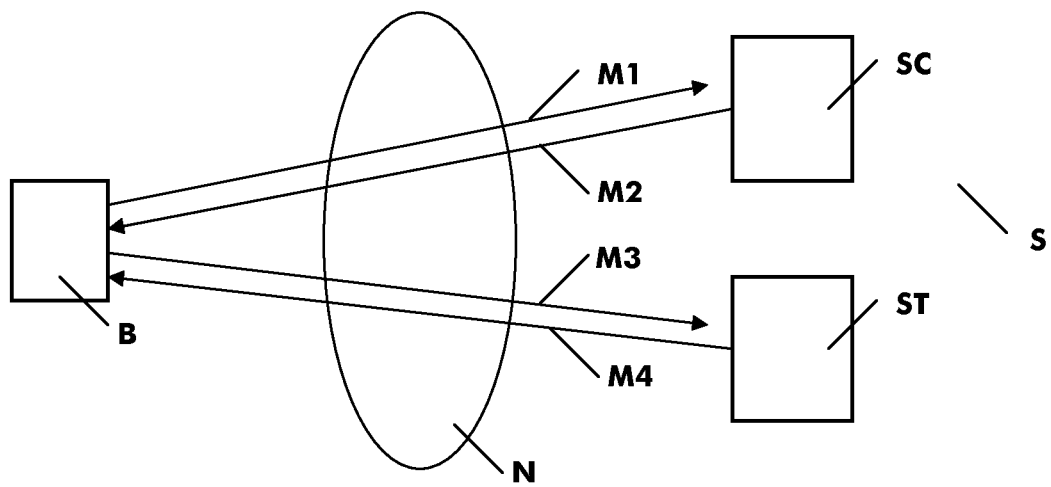

In FIG. 3, the monitoring server ST is located separate from the content server SC. The monitoring server ST may be a machine dedicated to that monitoring activity, or it may be a machine (or group of machines) hosting multiple software applications.

These two technical architectures may be the reflection of commercial choices.

In the first case, the two servers are administered by a single organization. The company in charge of the content may also deploy the monitoring server. If the company in question employs a host to deploy the content server, that host may also offer to deploy a monitoring server. It may be a service that is billable or included in a flat rate.

The second situation may correspond to a third-party company that specializes in Web services and particularly offers a monitoring service. The content company or its host may establish a service contract in order for it to monitor its visitors. It may then transmit reports on those visitors based on the collected information and on the terms of the contract.

The first situation may correspond to an e-commerce site and to the management of the virtual shopping cart by the company in charge of the content.

The invention does not depend on the chosen architecture and commercial model.

First, a browser (or browser) B transmits a content request M1 to a content server SC containing a URL.

The content server SC responds with one or more messages M2 containing the requested content. This content is typically a Web page, for example in HTML format (HyperText Markup Language).

It may be statically stored on the content server SC or be built dynamically on-the-fly based on the content of a database (mySQL, etc.) and PHP language scripts.

This content contains a portion related to the monitoring server ST. This portion may be transmitted beforehand by the monitoring server ST to the content server SC or be manually configured by an administrator.

The configuration of such a portion is known per se, as the majority of websites that include portions of third-party content (advertising insets) operate on this principle.

The content of this inset is specific to the invention.

According to the invention, this inset contains a set of links to monitoring elements. These monitoring elements are stored on the monitoring server ST. These are files of any type (image, text, etc.). It is desirable for them to be of minimum size in order to avoid degrading communications performance and taking up too much space on the monitoring server.

This inset may be written in HTML language as a <DIV> section.

An example of such an inset may be:

```
<DIV class=ST>
    <img src=http://www.st.com/tracker/elt_1.png>
    <img src=http://www.st.com/tracker/elt_2.png>
    <img src=http://www.st.com/tracker/elt_3.png>
</div>
```

In this example, the address www.st.com is a made-up address that corresponds to that of the server ST. The class "ST" also corresponds to the monitoring feature, and is a character string for internal use that makes it possible to control the graphical rendering of the <DIV> section using a style sheet (.css file), but with no technical effect.

The files "elt_1.png," "elt_2.png," "elt_3.png" are three monitoring elements, here images in png format.

When this message M2 is received, the browser B must retrieve monitoring elements in order to be able to produce the page and display it on the screen of the communication terminal on which it is deployed.

It therefore transmits a request M3 for monitoring elements to the monitoring server.

Typically, this request is made of GET messages in accordance with the HTTP protocol, with one GET message corresponding to one monitoring element.

Based on the DIV section of the example, the browser B may form three GET messages sent to the server www.st. com:

---
GET tracker/elt_1.png
GET tracker/elt_2.png
GET tracker/elt_3.png
---

Figure 1:
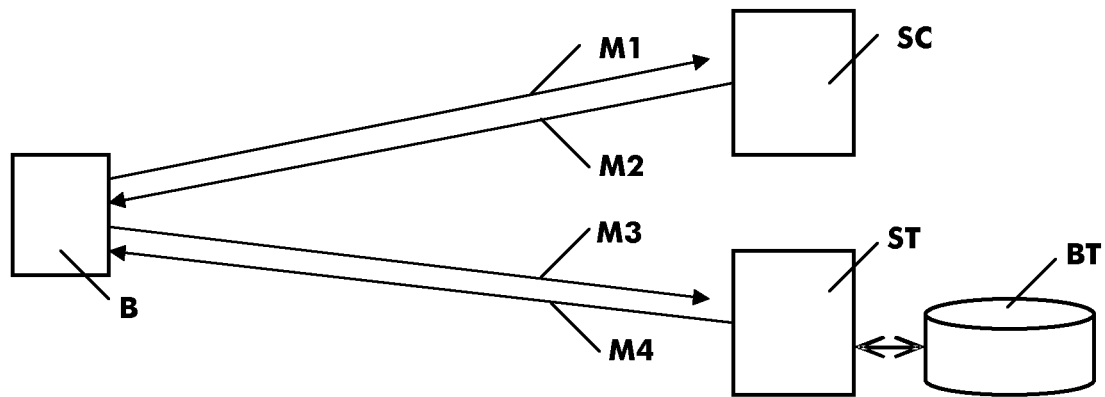
Figure 4:
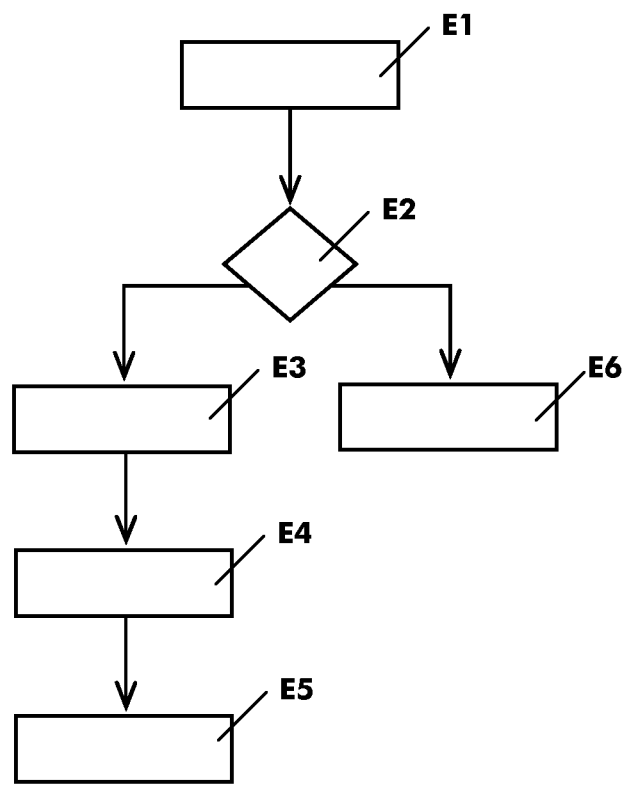
FIG. 4 is a flowchart of the various steps implemented by a monitoring server according to the invention.

This step of receiving a monitoring element request is designated E1 on the flowchart in FIG. 4.

Upon receiving this request, the monitoring server ST may implement a second step E2 of determining whether that request is a first request from the browser B.

This determination may be done based on the number of monitoring elements requested in the request M3. If the set of monitoring elements is requested, it is a first request. Otherwise, as we shall see later on, it is not a first request: There are monitoring elements in the browser's cache memory which are not being requested again.

In the depicted example, it is a first request. The monitoring server ST may then implement:
- a step E3 of calculating an identifier for the browser B, then
- a step E4 of determining a cache duration value associated with each monitoring element of that set, and
- a step E5 of transmitting the set of these monitoring elements and calculated values to the browser B.

This identifier may be a counter, incremented each time a new browser enters into contact with the monitoring server ST.

According to one preferential embodiment of the invention, this identifier is made up of a first part containing identification information transmitted in the request M3, and a second part formed of that counter.

This identification information may be the fingerprint of the browser B and may correspond to the "User Agent" header of messages M3 in accordance with the HTTP protocol. This header is a character string specifying the software used to connect to an HTTP server. As described above, it generally comprises the browser type (Mozilla, IE, Chrome, etc.) and a version number.

The counter makes it possible to uniquely distinguish between browsers with the same fingerprint.

Compared to an embodiment where the identifier is made of the counter alone, this implementation makes it possible to reduce the meter's size and therefore the number of monitoring elements. Thus, it is possible to reduce the memory resources on the monitoring server and in the browser's cache memory, as well as the volume of information to be transmitted.

It is also possible to use the transmission IP address of the request M3. This makes it possible to further reduce the space needed for the counter, because the counter will no longer be serving any purpose but to distinguish between browsers that belong to the same IP space and have the same fingerprint.

The length of the counter should therefore be defined in advance, which means estimating the expected maximum number of browsers that have the same fingerprint and belong to the same IP space. This number may be configured with a default value and can be edited by an administrator.

This length n (in bits) may be expressed based on the counter's maximum number N by the formula: $n=[\log_2(N)]+1$ The monitoring server ST saves n monitoring elements. These monitoring elements are files of different types (images, text, etc.). They are not necessarily all of the same type.

The next step E4 consists of determining a cache duration value associated with each monitoring element in that set of n elements.

There is actually a mechanism that allows browsers to store all or some of the downloaded elements in a cache memory. Thus, during a second visit to the same Web page, the browser will not re-download the elements already present in the cache memory. This mechanism makes it possible to minimize the transmitted volume of data.

The cache memory may be on the hard drive or the volatile memory of the communication terminal on which the browser is deployed.

According to one embodiment, the cache duration values are determined based on the counter's binary writing.

Thus, this counter may be written $b_n \ldots b_3\text{-}b_2\text{-}b_1$, where $b_i$ is the bit with significance i.

The value $v(i)$ for the element corresponding to the bit with significance i is given based on the following formula:

if $b(i)=1$, $v(i)=\max$ if $b(i)=0$, $v(i)=0$ wherein max is the maximum possible value for a given cache duration. It may also be an arbitrarily long value, long enough for the cache to not expire between two requests from the same browser.

The next step E5 consists of transmitting to the browser B the monitoring elements themselves and the cache duration values that were determined for each of them.

This transmission may consist of as many messages M4 as there are messages M3 in the request.

This is because, in the HTTP protocol, each GET message corresponds to a "200 OK" response message containing the requested element. In the example above, there will therefore be three messages containing the monitoring elements elt_1.png, elt_2.png, and elt_3.png.

Each response message may contain the corresponding cache duration value in the HTTP header.

---
If b(i)=0, this header may look like:
Status Code: 200 OK
Cache-control: private, no-transform, max-age=0
content-type: text/xml
Content-length: 670
server: jetty(6.1.x)
If b(i)=1, this header may look like:
Status Code: 200 OK
Cache-control: private, no-transform, max-age=2147483647
content-type: text/xml
Content-length: 670
server: jetty(6.1.x)
---

The parameter max-age in the cache-control line contains the value $v(i)$ which is equal to either 0, or the maximum allowed value. This parameter is defined in section 14.9.3 of RFC 2616 of the IETF.

It may be useful to additionally indicate the parameter "private" in order to prevent "proxies" (local intermediary elements that implement a cache mechanism) located between the browser B and the server from saving these monitoring elements in the cache and thereby from interfering with the invention's mechanism.

This keyword indicates that the management of the cache mechanism for these monitoring elements is "private," meaning that sole responsibility rests with the client (the browser B) and the server.

In the three-monitoring-element example described above, it is assumed that the calculated identifier is 3, or "011" in binary. The cache values are therefore 0 for elt_3.png, and max (i.e. 2147483647 seconds in this case) for elt_2.png and elt_1.png.

The monitoring elements are saved in the cache memory of the browser B.

When the same browser B transmits a new request to the content server SC, it receives a portion related to the monitoring server ST as previously mentioned. If it is the same page, that portion may be identical to the one previously received (unless, for example, it had been updated in the meantime).

In a manner known in and of itself, the browser is adapted to retrieve the monitoring elements in order to be able to produce the page and display it on the screen of the communication terminal on which it is deployed. This retrieval is performed based on the elements already present in the cache memory and based on the associated cache duration value.

When the associated value had been set to 0 by the server, regardless of the time between that request and the previous one, the browser must request the element from the monitoring server ST again. It therefore transmits a GET message requesting the element in question.

If the associated value had been set to "max," the browser B uses the saved monitoring element to present it to the user, without transmitting any messages to the monitoring server.

In our example, the browser therefore transmits two GET messages sent to the server www.st.com:

```
GET tracker/elt_1.png
GET tracker/elt_2.png
```

The browser's behavior is caused by information transmitted by the monitoring server ST in accordance with the invention, but the browser itself obeys the standard behavior of a browser in accordance with the HTTP protocol. The invention involves no changes to the browser or communication terminal.

The monitoring server ST receives this monitoring element request in a step E1.

The step E2 consists of determining whether or not it is a first request.

As not all of the monitoring elements are being requested again (the element elt_3.png is not being requested), the server ST may deduce from this that it is not a first request, and therefore that the browser B is already "known."

The monitoring server ST may then trigger a step E6 of determining that browser's identifier.

This determination is based on monitoring elements requested in the request, by a mechanism opposite the one used to generate the identifier.

In the described implementation, the positions of the monitoring elements makes it possible to write the identifier in binary form. If the elements elt_1.png and elt_2.png have been requested, the bits with significance 1 and 2 are set to 1; and if the element elt_3.png has not been request, the bit with significance 3 is set to 0. The browser's identifier is therefore written "011" in binary, or 3.

As the identifier is known, the monitoring server ST can implement different monitoring strategies. It may saved the collected information, particularly the URL addresses viewed on the content servers, and thereby build a profile of the browser's user based on his or her browsing history. Based on this profile, it may determine suitable advertising insets.

It may also use this information to build statistics on the visitors of a particular content site or set of sites.

In one variant of the invention, it is possible to use the HTTP protocol's redirect mechanism to reduce the length n of the counter and therefore the number of monitoring elements to use.

This redirect mechanism relies on messages 302 and 307 of the HTTP protocol.

In the portion related to the monitoring server ST, an address URL1 may be indicated. This address URL1 is configured in the monitoring server ST to redirect to an address URL2.

During a first visit, the browser follows the redirect, but during a second visit, the redirect is saved by the browser, which then directly queries the second address URL2.

It is possible to use this behavior to identify the users, by chaining together multiple redirects r1, r2, r3, r4, r5.

Whenever a user connects to a site for the first time, it follows the chained redirect: r1->r2->r3->r4->r5. It automatically downloads the redirect elements r1, r2, r3, r4, r5.

The server may set different cache values for each redirect element, for example a null value for r2 and r5 and a very high value for the other elements.

Thus, during a later visit, the browser goes directly to the address indicated by r2 and follows the following path: r2->r5.

It will therefore be possible to deduce from this that the browser has the elements r1, r3 and r4 in its cache, and based on this information, to distinguish between multiple users.

Figure 5:
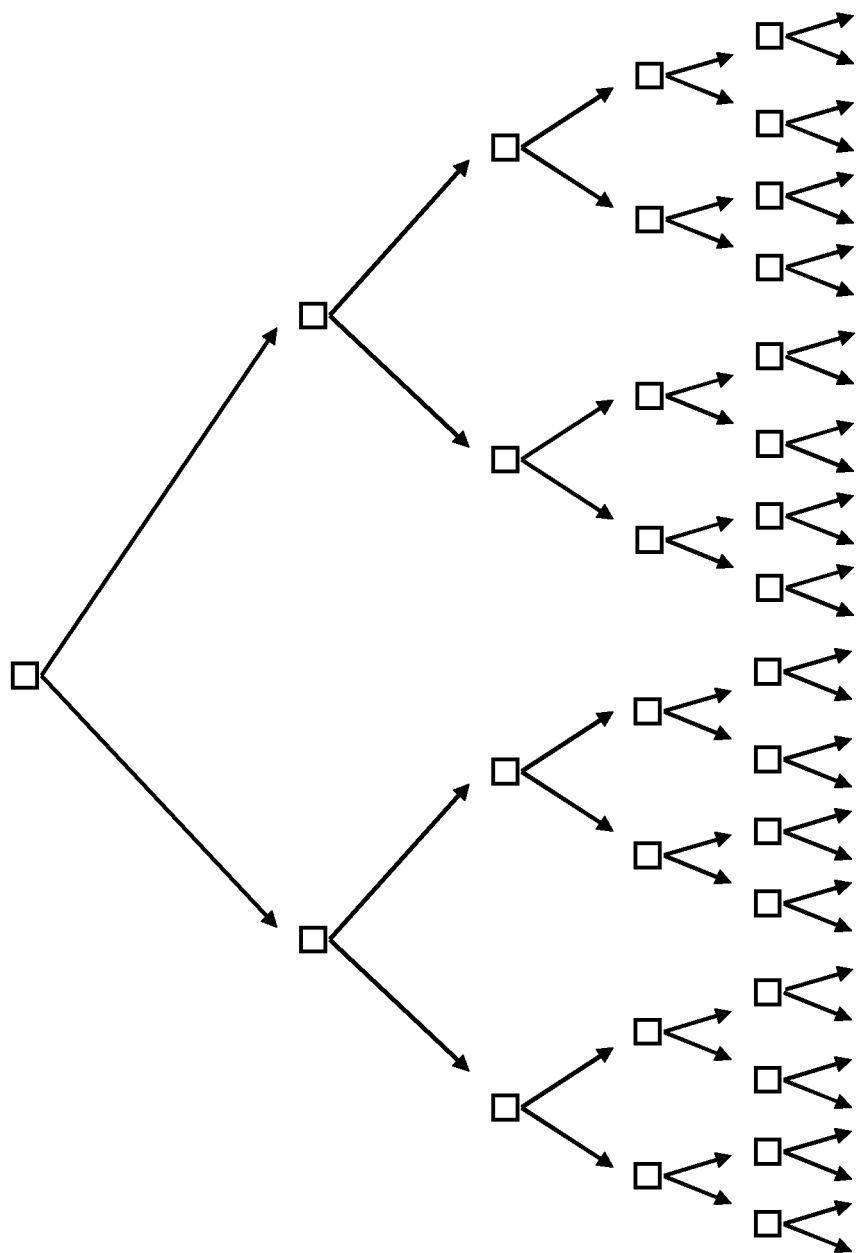
FIG. 5 is an illustration of one embodiment of the invention using a redirect mechanism with two redirect code values.

One alternative may consist of using different redirect codes rather than different cache values. For example, it is possible to use redirect code 301 and redirect code 302. By chaining together redirects with these two code values, it is possible to obtain a binary tree as depicted in FIG. 5. In this figure, it is assumed that the rising branches correspond to code value 301 and that the descending branches correspond to code value 302.

The browsers generally have a maximum value of the number of tolerated redirects (for example, 5). This way, this mechanism only makes it possible to distinguish a limited number of users, here $2^5=32$ According to one embodiment of the invention, this mechanism is used to complement the use of monitoring elements in order to reduce the number of them to be managed. This implementation of the invention thereby makes it possible to reduce the resources needed for the invention on the servers, in the browser's cache memory and in transmissions on the communications network.

To do so, the identification of the browser may be preceded by a first part (the most significant) indicating redirect elements.

In a manner similar to what was previously described as a possible implementation of writing the identifier based on the monitoring elements, this first part may be written rk . . . r3-r2-r1 in which ri is the bit with significance i and k is the number of possible redirects.

The chained redirects may be indicated by the bit with matching significance in said first part.

The value v(i) for the redirect element corresponding to the bit with significance i is given based on the following formula:

if ri=1, v(i)=max if ri=0, v(i)=0 wherein max is the maximum possible value for a given cache duration. It may also be an arbitrarily long value, long enough for the cache to not expire between two requests from the same browser.

Another possible formula may be based on different redirect codes:

if ri=1, v(i)=301 if ri=0, v(i)=302

The identifier of the browser with the first part may be written rk ... r3-r2-r1-bn ... b3-b2-b1. The total length is equal to k+n.

The invention claimed is:

1. A method for monitoring browsers for a communications network at a monitoring server, wherein the monitoring server contains a set of monitoring elements, the method comprising:
receiving a monitoring element request from a browser without using a cookie,
determining whether the monitoring element request is a first request from the browser by comparing the monitoring element request to the set of monitoring elements contained in the monitoring server,
calculating an identifier for the browser comprising a counter and a browser fingerprint in response to determining the monitoring element request is the first request from the browser without using the cookie, then determining a cache duration value associated with each monitoring element of the set, wherein the cache duration value is determined using a counter, and transmitting the set of the monitoring elements and the cache duration values to the browser;
determining the identifier for the browser based on the monitoring elements requested in the monitoring element request in response to determining the monitoring element request is not the first request from the browser,
wherein the identifier is preceded by a first part indicating chained redirects.

2. A method according to claim 1, wherein whether a request is a first request may be determined based on the number of monitoring elements requested in the request.

3. A method according to claim 1, comprising a prior first step of the browser transmitting a content request to a content server, and of the content server transmitting both the requested content and an inset containing links leading to the monitoring elements.

4. A method according to claim 1, wherein the identifier is made up of a second part containing identification information transmitted in the request, and a third part formed of the counter.

5. A method according to claim 4, wherein the number of monitoring elements in the set is equal to the length of the counter, expressed in bits.

6. A method according to claim 1, wherein the value of a bit b(i) with significance i and the cache duration value associated with the monitoring element at position i follows the following relationship:

if b(i)=1, v(i)=max, if b(i)=O, v(i)=O, wherein 'v(i)' is the cache duration value, and
wherein 'max' is the maximum possible value for a given cache duration.

7. A method according to claim 1, wherein the chained redirects are indicated by the bit with matching significance in the first part.

8. A method according to claim 1, wherein a single redirect among the chained redirects is associated with a cache value of zero or a maximum possible value for a cache value.

9. A method according to claim 1, wherein each redirect among the chained redirects may be associated with a 301 or 302 redirect code.

10. A monitoring server containing: a set of monitoring elements, and at least one implementing processor, configured to:
receive a monitoring element request from a browser without using a cookie,
determine whether the request is a first request from the browser by comparing the set of monitoring elements to the monitor element request for similar monitoring elements,
calculate an identifier for the browser comprising a counter and a browser fingerprint when the request is the first request such that the set of monitoring elements is not similar to the monitor element request, then determine a cache duration value associated with each monitoring element of the set, wherein the cache duration value is determined using a counter, and transmit the set of the monitoring elements and the values to the browser;
determine the identifier for the browser based on the monitoring elements requested in the request when the request is not the first request such that the set of monitoring elements includes a similar monitoring element to the monitor element request,
wherein the identifier is preceded by a first part indicating chained redirects.

11. A server comprising:
a monitoring server containing a set of monitoring elements, and at least one implementing processor, configured to:
receive a monitoring element request from a browser, wherein the monitoring element request includes at least one monitoring element without using a cookie,
determine whether the request is a first request from the browser, wherein the determination comprises identifying a match between the at least one monitoring element of the monitoring element request and the set of monitoring elements of the monitoring server,
calculate an identifier for the browser comprising a counter and a browser fingerprint in response to the determination that the monitoring element request is the first request, then determine a cache duration value associated with each monitoring element of the set wherein the cache duration value is determined using a counter, and transmit the set of the monitoring elements and the values to the browser;
determine the identifier for the browser based on the monitoring elements requested in the request in response to the determination that the monitoring element request is not the first request and wherein the identifier is preceded by a first part indicating chained redirects; and a content server.

* * * * *